US00RE49119E

(19) United States
(12) Reissued Patent
Peterson et al.

(10) Patent Number: US RE49,119 E
(45) Date of Reissued Patent: *Jun. 28, 2022

(54) SYSTEM AND METHOD FOR RULES-BASED CONTROL OF CUSTODY OF ELECTRONIC SIGNATURE TRANSACTIONS

(71) Applicant: DocuSign, Inc., San Francisco, CA (US)

(72) Inventors: Donald G. Peterson, Kirkland, WA (US); Douglas P. Rybacki, Seattle, WA (US); Duane E. Wald, Kent, WA (US)

(73) Assignee: DOCUSIGN, INC., San Francisco, CA (US)

( * ) Notice: This patent is subject to a terminal disclaimer.

(21) Appl. No.: 16/785,080

(22) Filed: Feb. 7, 2020

Related U.S. Patent Documents

Reissue of:
(64) Patent No.: 9,893,895
Issued: Feb. 13, 2018
Appl. No.: 14/986,226
Filed: Dec. 31, 2015

U.S. Applications:
(63) Continuation of application No. 13/838,233, filed on Mar. 15, 2013, now Pat. No. 9,230,130.
(Continued)

(51) Int. Cl.
*G06F 7/04* (2006.01)
*H04L 29/06* (2006.01)
(Continued)

(52) U.S. Cl.
CPC ..... *H04L 9/3247* (2013.01); *G06F 21/604* (2013.01); *G06F 21/6218* (2013.01);
(Continued)

(58) Field of Classification Search
CPC . H04L 9/3247; H04L 9/3297; H04L 63/0853; H04L 63/108; H04L 2209/603;
(Continued)

(56) References Cited

U.S. PATENT DOCUMENTS 5,040,142 A 8/1991 Mori et al.
5,220,675 A 6/1993 Padawer et al.
(Continued)

FOREIGN PATENT DOCUMENTS

CN 101299256 A 11/2008
CN 104412276 A 3/2015
(Continued)

OTHER PUBLICATIONS

"U.S. Appl. No. 13/838,233, Examiner Interview Summary dated May 15, 2015", 4 pgs.
(Continued)

*Primary Examiner* — Colin M Larose
(74) *Attorney, Agent, or Firm* — Fenwick & West LLP

(57) ABSTRACT

Techniques for electronic signature processes are described. Some embodiments provide an electronic signature service ("ESS") configured to facilitate the creation, storage, and management of electronic signature documents. In one embodiment, an electronic signature document may be associated with custody transfer rules that facilitate transfers of custody of an electronic signature document from one user or party to another. A custody transfer may results in a transfer of rights or capabilities to operate upon (e.g., modify, view, send, delete) an electronic signature document and/or its associated data. A custody transfer rule may be trigged by the occurrence of a particular event, such as the receipt of an electronic signature.

15 Claims, 3 Drawing Sheets

Related U.S. Application Data

(60) Provisional application No. 61/614,371, filed on Mar. 22, 2012.

(51) Int. Cl.

| | |
|---|---|
| ***H04L 9/32*** | (2006.01) |
| ***G06F 21/60*** | (2013.01) |
| ***G06F 21/62*** | (2013.01) |
| ***G06F 21/64*** | (2013.01) |
| ***G06Q 10/06*** | (2012.01) |
| ***G06Q 10/10*** | (2012.01) |
| ***G11B 20/00*** | (2006.01) |
| ***H04L 9/40*** | (2022.01) |

(52) U.S. Cl.
CPC ..... *G06F 21/6272* (2013.01); *G06F 21/645* (2013.01); *G06Q 10/06* (2013.01); *G06Q 10/10* (2013.01); *G11B 20/00862* (2013.01); *H04L 9/3297* (2013.01); *H04L 63/0853* (2013.01); *H04L 63/108* (2013.01); *G06F 2221/2137* (2013.01); *G06F 2221/2141* (2013.01); *H04L 2209/603* (2013.01); *H04L 2463/101* (2013.01)

(58) Field of Classification Search
CPC . H04L 2463/101; H04L 9/321; G06F 21/604; G06F 21/6218; G06F 21/6272; G06F 21/645; G06F 2221/2137; G06F 2221/2141; G06Q 10/06; G06Q 10/10; G11B 20/00862; H09L 9/32
See application file for complete search history.

(56) References Cited

U.S. PATENT DOCUMENTS 5,222,138 A 6/1993 Balabon et al.
5,337,360 A 8/1994 Fischer
5,390,247 A 2/1995 Fischer
5,465,299 A 11/1995 Matsumoto et al.
5,544,255 A 8/1996 Smithies et al.
5,553,145 A 9/1996 Micali
5,615,268 A 3/1997 Bisbee et al.
5,629,982 A 5/1997 Micali
5,689,567 A 11/1997 Miyauchi
5,748,738 A 5/1998 Bisbee et al.
5,813,009 A 9/1998 Johnson et al.
5,832,499 A 11/1998 Gustman
5,872,848 A 2/1999 Romney et al.
5,898,156 A 4/1999 Wilfong
6,021,202 A 2/2000 Anderson et al.
6,067,531 A 5/2000 Hoyt et al.
6,085,322 A 7/2000 Romney et al.
6,092,080 A 7/2000 Gustman
6,119,229 A 9/2000 Martinez et al.
6,128,740 A 10/2000 Curry et al.
6,161,139 A 12/2000 Win et al.
6,185,587 B1 2/2001 Bernardo et al.
6,185,683 B1 2/2001 Ginter et al.
6,199,052 B1 3/2001 Mitty et al.
6,210,276 B1 4/2001 Mullins
6,237,096 B1 5/2001 Bisbee et al.
6,289,460 B1 9/2001 Hajmiragha
6,321,333 B1 11/2001 Murray
6,327,656 B2 12/2001 Zabetian
6,367,010 B1 4/2002 Venkatram et al.
6,367,013 B1 4/2002 Bisbee et al.
6,446,115 B2 9/2002 Powers
6,470,448 B1 10/2002 Kuroda et al.
6,584,466 B1 6/2003 Serbinis et al.
6,615,348 B1 9/2003 Gibbs
6,658,403 B1 12/2003 Kuroda et al.
6,671,805 B1 12/2003 Brown et al.
6,728,762 B1 4/2004 Estrada et al.
6,751,632 B1 6/2004 Petrogiannis
6,754,829 B1 6/2004 Butt et al.
6,796,489 B2 9/2004 Slater et al.
6,807,633 B1 10/2004 Pavlik
6,829,635 B1 12/2004 Townshend
6,912,660 B1 6/2005 Petrogiannis
6,931,420 B1 8/2005 Silvester et al.
6,938,157 B2 8/2005 Kaplan
6,944,648 B2 9/2005 Cochran et al.
6,947,911 B1 9/2005 Moritsu et al.
6,959,382 B1 10/2005 Kinnis et al.
6,961,854 B2 11/2005 Serret-avila et al.
6,973,569 B1 12/2005 Anderson et al.
6,990,684 B2 1/2006 Futamura et al.
7,039,805 B1 5/2006 Messing
7,059,516 B2 6/2006 Matsuyama et al.
7,069,443 B2 6/2006 Berringer et al.
7,093,130 B1 8/2006 Kobayashi et al.
7,100,045 B2 8/2006 Yamada et al.
7,103,778 B2 9/2006 Kon et al.
7,130,829 B2 * 10/2006 Banerjee ..... G06Q 30/06 705/51
7,162,635 B2 1/2007 Bisbee et al.
7,167,844 B1 1/2007 Leong et al.
7,197,644 B2 3/2007 Brewington
7,237,114 B1 6/2007 Rosenberg
7,340,608 B2 * 3/2008 Laurie ..... G06F 21/645 705/75
7,360,079 B2 4/2008 Wall
7,395,436 B1 7/2008 Nemovicher
7,424,543 B2 9/2008 Rice, III
7,437,421 B2 10/2008 Bhogal et al.
7,523,315 B2 4/2009 Hougaard et al.
7,533,268 B1 5/2009 Catorcini et al.
7,554,576 B2 6/2009 Erol
7,562,053 B2 7/2009 Twining et al.
7,568,101 B1 7/2009 Catorcini et al.
7,568,104 B2 7/2009 Berryman et al.
7,581,105 B2 8/2009 Dietl
7,657,832 B1 2/2010 Lin
7,660,863 B2 2/2010 De Boursetty et al.
7,660,981 B1 * 2/2010 Hunt ..... H04L 63/0823 713/156
7,743,248 B2 * 6/2010 Bisbee ..... G06Q 20/00 713/158
7,788,259 B2 8/2010 Patterson et al.
7,822,690 B2 * 10/2010 Rakowicz ..... G06Q 50/16 705/75
7,934,098 B1 4/2011 Hahn et al.
7,953,977 B2 5/2011 Maruyama et al.
8,103,867 B2 1/2012 Spitz
8,132,013 B2 3/2012 Meier
8,286,071 B1 10/2012 Zimmerman et al.
8,442,884 B2 * 5/2013 Haberstroh ..... G06Q 20/10 705/36 R
8,588,483 B2 11/2013 Hicks et al.
8,612,349 B1 12/2013 Ledder et al.
8,627,500 B2 * 1/2014 Rogel ..... G06F 21/10 705/26.1
8,924,302 B2 * 12/2014 Bisbee ..... H04L 9/321 705/50
9,230,130 B2 1/2016 Peterson et al.
2001/0002485 A1 * 5/2001 Bisbee ..... G06Q 20/00 713/167
2001/0018739 A1 8/2001 Anderson et al.
2001/0034739 A1 10/2001 Anecki et al.
2001/0034835 A1 10/2001 Smith
2002/0004800 A1 1/2002 Kikuta et al.
2002/0019937 A1 2/2002 Edstrom et al.
2002/0026427 A1 2/2002 Kon et al.
2002/0026582 A1 2/2002 Futamura et al.
2002/0040431 A1 4/2002 Kato et al.
2002/0069179 A1 6/2002 Slater et al.
2002/0069358 A1 6/2002 Silvester
2002/0129056 A1 9/2002 Conant et al.
2002/0138445 A1 9/2002 Laage et al.
2002/0143711 A1 10/2002 Nassiri
2002/0162000 A1 10/2002 Benzler

(56) References Cited

U.S. PATENT DOCUMENTS

2002/0169640 A1* 11/2002 Freeland ..... G06Q 50/188 705/37
2002/0178187 A1 11/2002 Rasmussen et al.
2002/0184485 A1 12/2002 Dray, Jr. et al.
2002/0194219 A1 12/2002 Bradley et al.
2002/0196478 A1 12/2002 Struble
2003/0048301 A1 3/2003 Menninger
2003/0051016 A1 3/2003 Miyoshi et al.
2003/0078880 A1 4/2003 Alley et al.
2003/0120553 A1 6/2003 Williams
2003/0120930 A1 6/2003 Simpson et al.
2003/0131073 A1 7/2003 Lucovsky et al.
2003/0140252 A1 7/2003 Lafon et al.
2003/0217264 A1 11/2003 Martin et al.
2003/0217275 A1 11/2003 Bentley et al.
2004/0054606 A1 3/2004 Broerman
2004/0078337 A1 4/2004 King et al.
2004/0107352 A1 6/2004 Yui et al.
2004/0117627 A1 6/2004 Brewington
2004/0133493 A1 7/2004 Ford et al.
2004/0181756 A1 9/2004 Berringer et al.
2004/0225884 A1 11/2004 Lorenzini et al.
2004/0230891 A1 11/2004 Pravetz et al.
2004/0250070 A1 12/2004 Wong
2004/0255114 A1 12/2004 Lee et al.
2004/0255127 A1 12/2004 Arnouse
2005/0033811 A1 2/2005 Bhogal et al.
2005/0049903 A1 3/2005 Raja
2005/0071658 A1 3/2005 Nath et al.
2005/0076215 A1 4/2005 Dryer
2005/0091143 A1 4/2005 Schmidt et al.
2005/0120217 A1 6/2005 Fifield et al.
2005/0165626 A1 7/2005 Karpf
2005/0182684 A1 8/2005 Dawson et al.
2005/0182956 A1 8/2005 Ginter et al.
2005/0192908 A1 9/2005 Jorimann et al.
2005/0231738 A1 10/2005 Huff et al.
2006/0047600 A1 3/2006 Bodenheim et al.
2006/0129809 A1 6/2006 Battagin et al.
2006/0153380 A1 7/2006 Gertner
2006/0161780 A1 7/2006 Berryman et al.
2006/0161781 A1 7/2006 Rice et al.
2006/0174199 A1 8/2006 Soltis et al.
2006/0205476 A1 9/2006 Jubinville
2006/0230282 A1 10/2006 Hausler
2006/0259440 A1 11/2006 Leake et al.
2006/0261545 A1 11/2006 Rogers
2006/0294152 A1 12/2006 Kawabe et al.
2007/0026927 A1 2/2007 Yaldoo et al.
2007/0079139 A1 4/2007 Kim
2007/0088958 A1 4/2007 Qa'im-maqami
2007/0100765 A1 5/2007 Naganuma
2007/0118732 A1 5/2007 Whitmore
2007/0130186 A1 6/2007 Ramsey et al.
2007/0136361 A1 6/2007 Lee et al.
2007/0143085 A1 6/2007 Kimmel
2007/0165865 A1 7/2007 Talvitie
2007/0198533 A1 8/2007 Foygel et al.
2007/0208944 A1 9/2007 Pavlicic
2007/0220260 A1 9/2007 King
2007/0271592 A1 11/2007 Noda et al.
2007/0289022 A1 12/2007 Wittkotter
2008/0016357 A1 1/2008 Suarez
2008/0034213 A1 2/2008 Boemker et al.
2008/0097777 A1 4/2008 Rielo
2008/0141033 A1 6/2008 Ginter et al.
2008/0209313 A1 8/2008 Gonser
2008/0209516 A1 8/2008 Nassiri
2008/0216147 A1 9/2008 Duffy
2008/0235577 A1 9/2008 Veluchamy et al.
2008/0260287 A1 10/2008 Berryman et al.
2008/0313723 A1 12/2008 Naono et al.
2009/0024912 A1 1/2009 Mccabe et al.
2009/0025087 A1 1/2009 Peirson, Jr. et al.
2009/0044019 A1 2/2009 Lee et al.
2009/0099881 A1 4/2009 Hanna et al.
2009/0132351 A1 5/2009 Gibson
2009/0138730 A1 5/2009 Cook et al.
2009/0145958 A1 6/2009 Stoutenburg et al.
2009/0164488 A1 6/2009 Katsurabayashi
2009/0185241 A1 7/2009 Nepomniachtchi
2009/0268903 A1 10/2009 Bojinov et al.
2009/0292786 A1 11/2009 Mccabe et al.
2010/0088364 A1 4/2010 Carter et al.
2010/0122094 A1 5/2010 Shima
2010/0153011 A1 6/2010 Obrea et al.
2010/0217987 A1 8/2010 Shevadex
2010/0235727 A1 9/2010 Ashton et al.
2010/0242085 A1 9/2010 Dutta et al.
2010/0274863 A1 10/2010 Foygel et al.
2010/0287260 A1 11/2010 Peterson et al.
2010/0293094 A1 11/2010 Kolkowitz et al.
2011/0093769 A1 4/2011 Dunn et al.
2011/0119165 A1 5/2011 Zee
2011/0126022 A1 5/2011 Sieberer
2011/0153560 A1* 6/2011 Bryant ..... G06F 16/93 707/610
2011/0238510 A1 9/2011 Rowen et al.
2011/0264907 A1 10/2011 Betz et al.
2011/0314371 A1 12/2011 Peterson et al.
2012/0072837 A1* 3/2012 Triola ..... G06Q 10/10 715/268
2012/0180135 A1 7/2012 Hodges et al.
2012/0209970 A1 8/2012 Scipioni et al.
2012/0271882 A1 10/2012 Sachdeva et al.
2012/0304265 A1 11/2012 Richter et al.
2013/0019156 A1 1/2013 Gonser
2013/0019289 A1 1/2013 Gonser et al.
2013/0050512 A1 2/2013 Gonser et al.
2013/0060661 A1* 3/2013 Block ..... G06F 21/10 705/26.44
2013/0067243 A1 3/2013 Tamayo-Rios et al.
2013/0159720 A1 6/2013 Gonser et al.
2013/0179676 A1 7/2013 Hamid
2013/0254111 A1 9/2013 Gonser et al.
2013/0263283 A1 10/2013 Peterson et al.
2014/0019761 A1 1/2014 Shapiro

FOREIGN PATENT DOCUMENTS

EP 1238321 A1 9/2002
EP 2828784 A1 1/2015
JP 2000048072 A 2/2000
JP 2003271529 A 9/2003
JP 2004200740 A 7/2004
JP 2005135072 A 5/2005
JP 2005267438 A 9/2005
JP 2007109182 A 4/2007
JP 2008117258 A 5/2008
JP 2008225527 A 9/2008
JP 2009157422 A 7/2009
JP 2015515677 A 5/2015
KR 20000049674 A 8/2000
KR 1020020092595 A 12/2002
KR 1020070059931 A 6/2007
KR 100929488 B1 12/2009
KR 20090122657 A 12/2009
RU 2291491 C2 1/2007
RU 2300844 C2 6/2007
RU 2400811 C2 9/2010
WO WO-9607156 A1 3/1996
WO WO-03091834 A2 11/2003
WO WO-2007075235 A1 7/2007
WO WO-2008124627 A1 10/2008
WO WO-2009012478 A3 1/2009
WO WO-2010105262 A1 9/2010
WO WO-2013142438 A1 9/2013
WO WO-2013142438 A9 9/2013

OTHER PUBLICATIONS

"U.S. Appl. No. 13/838,233, Non Final Office Action dated Feb. 17, 2015", 36 pgs.

(56) References Cited

OTHER PUBLICATIONS

"U.S. Appl. No. 13/838,233, Notice of Allowability dated Dec. 9, 2015".
"U.S. Appl. No. 13/838,233, Notice of Allowance dated Aug. 21, 2015", 10 pgs.
"U.S. Appl. No. 13/838,233, Response filed May 18, 2015 to Non Final Office Action dated Feb. 17, 2015", 17 pgs.
"Chinese Application Serial No. 201380026480.2, Office Action dated Aug. 31, 2016", W/English Translation, 10 pgs.
"eLynx Adds Workftow Management to Electronic Document Platform—new Workflow Capabilities Provide for Enhanced Electronic Loan Processing", [Online]. Retrieved from the Internet: <URL: http://www.elynx.com/news/view/82, (Jan. 2009), 2 pgs.
"European Application Serial No. 13764546.1, Extended European Search Report dated Oct. 30, 2015", 6 pgs.
"European Application Serial No. 13764546.1, Office Action dated Oct. 31, 2014", 3 pgs.
"European Application Serial No. 13764546.1, Response filed Apr. 22, 2015 to Office Action dated Oct. 31, 2014", 1 pg.
"International Application Serial No. PCT/US2013/032853, International Preliminary Report on Patentability dated Oct. 2, 2014", 4 pgs.
"International Application Serial No. PCT/US2013/032853, International Search Report dated Jul. 25, 2013", 2 pgs.
"International Application Serial No. PCT/US2013/032853, Written Opinion dated Jul. 25, 2013", 3 pgs.
Borozdin, "DocuSign Connect Service Guide", DocuSign, Inc, (2008), 1-9.
Brown, et al., "Digital Signatures: Can They Be Accepted as Legal Signatures in EID?", ACM, (Dec. 1993), 86-92.
Du, Timon C, et al., "Document access control in organisational workflows", International Journal of Information and Computer Security, vol. 1, No. 4, (2007), 437-454.
Harold, Elliotte Rusty, "XML Bible", IDG Books Worldwide, Inc.,, (1999), 191-192.
Herzberg, et al., "SurfN'Sign: Client Signatures on Web Documents", IEEE, vol. 37 Issue 1,, (1998), 61-71.
Kamara, et al., "Cryptographic Cloud Storage", Published in "Financial Cryptography and Data Security" Springer,, (2010), 136-149.
Kwok, et al., "An Automatic Electronic Contract Document Signing System in a Secure Environment", IEEE, (2005), 497-502.
Laurens, Leurs, "The history of PDF", Prepressure.com, (Feb. 14, 2010), 1-12.
Su, et al., "Signature-In-Signature Verification via a Secure Simple Network Protocol", IEEE, (2010), 1-4.
Wheeler, et al., "DocuSign Unveils new Scalable Product and Support Offerings of Electronic Signature and Electronic Contract Execution", DocuSign the Fastest Way to Get a Signature, (Jan. 2008), 1 pg.
Zefferer, et al., "An Electronic-Signature Based Circular Resolution Database System", ACM, (Mar. 2010), 1840-1845.
"Australian Application Serial No. 2013235309, First Examination Report dated Jun. 29, 2017", 4 pgs.
"Chinese Application Serial No. 201380026480.2, Office Action dated May 25. 2017", W/English Translation, 11 gps.
"Chinese Application Serial No. 201380026480.2, Response filed Jan. 16, 2017 to Office Action dated Aug. 31, 2016", w/English Claims, 19 pgs.
"Japanese Application Serial No. 2015-501837, Office Action dated Mar. 21, 2017", w/English Claims, 8 pgs.
"Singapore Application Serial No. 11201405878X, Written Opinion dated May 2, 2017", w/English Translation, 6 pgs.
"Chinese Application Serial No. 201380026480.2, Response filed Aug. 8, 2017 to Office Action dated May 25, 2017", W/ English Claims, 17 pgs.
"Japanese Application Serial No. 2015-501837, Response filed Aug. 17, 2017 to Office Action dated Mar. 21, 2017", W/ English Claims, 19 pgs.

* cited by examiner

SYSTEM AND METHOD FOR RULES-BASED CONTROL OF CUSTODY OF ELECTRONIC SIGNATURE TRANSACTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application *is a reissue of U.S. Pat. No. 9,893,895, which was filed as application Ser. No. 14/986,226 on Dec. 31, 2015, which* is a Continuation of U.S. patent application Ser. No. 13/838,233, filed Mar. 15, 2013, *now U.S. Pat. No. 9,230,130,* which application claims the benefit of U.S. Provisional Application No. 61/614,371, filed Mar. 22, 2012, which applications are incorporated herein by reference in their entirety.

FIELD OF THE INVENTION

The present disclosure relates to systems and methods for electronic signatures and, more particularly, to systems and methods for rules-based control of custody of electronic signature documents.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based methods and systems for facilitating electronic signatures. Example embodiments provide an electronic signature service ("ESS") configured to facilitate the creation, storage, and management of documents and corresponding electronic signatures. Using the ESS, a first user (a "sender") can provide or upload a document to be signed ("a signature document"), while a second user (a "signer") can access, review, and sign the uploaded document.

Some embodiments of the ESS facilitate rules-based control of custody of electronic signature documents. In one embodiment, an electronic signature document includes or is associated with custody transfer rules (or simply, "custody rules") that govern, control, or facilitate transfers of custody of an electronic signature document from one user or party to another. A custody transfer typically results in a transfer of rights or capabilities to operate upon (e.g., modify, view, send, delete) an electronic signature document and/or its associated data (e.g., history, form data, signature data). In some embodiments, when an electronic signature document changes custody, a first party associated with the document (e.g., that created, edited, or sent the document) loses one or more previously held rights to the document while a second party gains those and possibly other rights. For example, upon custody transfer, a first user (e.g., the initial document sender) may lose the right to edit or delete the document, while a second user (e.g., a manager) may gain the rights to view, edit, and delete the document. The first user may in some embodiments or configurations retain some rights, such as "read only" access allowing the first user to view the document.

Custody transfer rules may also specify conditions under which transfers of custody are to take place. For example, a sales organization may have two distinct types of users: sales representatives and sales managers. A sales representative may create an electronic signature document (or clone or copy an existing one) that represents a sales contract with a customer. Such an electronic signature document may be associated with custody transfer rules that cause custody of the document to transfer from the sales representative to the sales manager upon the occurrence of one or more events, such as when a customer completes an electronic signature, thereby closing a sale or otherwise completing a transaction. Other conditions may be specified, such as when the sales representative initially sends the electronic signature document to the customer, when a customer indicates refusal to sign the electronic signature document, when a specified amount or period of time passes, or the like.

Figure 1:
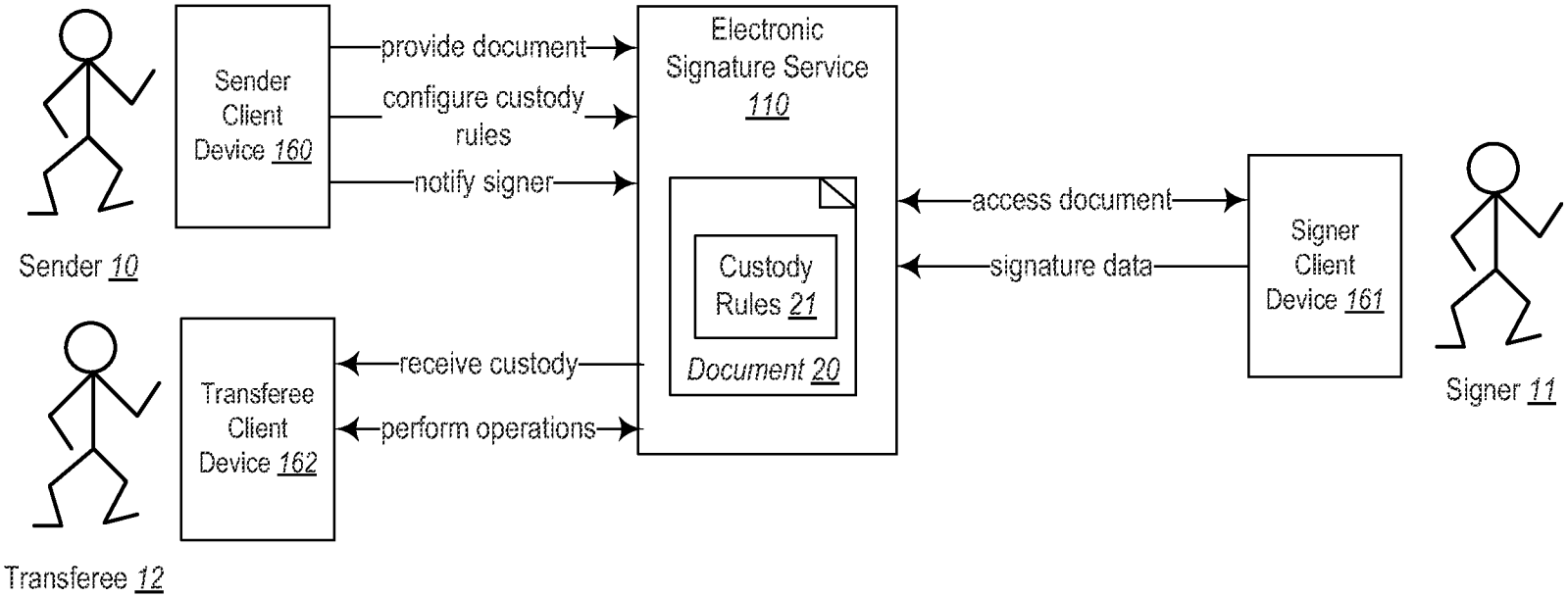
FIG. 1 illustrates an example block diagram of an example embodiment of an electronic signature service.

FIG. 1 illustrates an example block diagram of an example embodiment of an electronic signature service. In particular, FIG. 1 depicts an ESS 110 utilized by a sender user 10 and a signer user 11 to perform an electronic signing of a signature document 20. FIG. 1 also depicts a transferee 12 who receives custody of the signature document 20.

In the illustrated scenario, the sender 10 operates a sender client device 160 in order to provide (e.g., upload, transmit) an electronic document 20 (e.g., an invoice, contract, or agreement) to the ESS 110, where it is securely stored. The electronic document includes or is associated with custody rules 21 that are configured to cause custody of the document 20 to transfer from the sender 10 to the transferee 12, possibly upon the occurrence of one or more conditions. In some embodiments or configurations, the sender 10 and transferee 12 may be in or work for the same organization. For example, the sender 10 may be a sales representative while the transferee 12 may be a sales manager or an in-house attorney who reviews and records sales contracts. In other situations, the sender 10 and transferee 12 may work for distinct organizations or entities.

The sender 10 and/or some other user (e.g., an administrator) may configure the document 20 and/or the custody rules 21. For example, an administrator may interact with a user interface configured to facilitate the specification of custody rules and associated conditions. The custody rules 21 are then stored by the ESS 110 in association with the document 20. In this example, the custody rules 21 are configured to cause custody of the document 20 to transfer to the transferee upon signature by the signer 11. At this time, the sender 10 may further modify, configure, or customize the document 20, such as by changing price and quantity terms, party names, dates, and the like.

After the sender 10 configures the document 20 to his satisfaction, the signer 11 may access the document 20. In one embodiment, the sender 10 notifies the signer 11, such as by causing the ESS 110 to send to the signer 11 a message (e.g., an email) that includes a reference (e.g., a URL) to the document 20 stored by the ESS 110. As another example, the sender 10 may directly include the document 20 in an email or other message transmitted to the signer 11. As a further example, the document 20 may be automatically presented to the signer 11 as part of a transaction. For example, an e-commerce system may cause the document 20 to be presented or transmitted to the signer 11 during or as part of a transaction for a good/service purchased via the e-commerce system.

Typically, the signer 11 operates a Web browser or other client module executing on the signer client device 161 to access and review the document 20 via the ESS 110. For example, if the signer 11 receives an email that includes a link to the document 20, the signer can click the link to visit the ESS 110 in order review and sign the document 20. If instead the signer 11 receives the document 20 itself directly from the sender 10, opening the document will also cause the user to visit the ESS 110 to provide the required signature information. When the document 20 and related data have been reviewed (and possibly modified) to the satisfaction of the signer 11, the signer attaches (or provides an indication or instruction to attach) his electronic signature to the document 20.

Once the signing has been completed, the ESS 110 causes custody of the document 20 to change from the sender 10 to the transferee 12. At this time, the sender 10 may lose one or more rights, such as the right to view, modify, or delete the document 20. In addition, the transferee 12 may gain one or more rights, such as the right to view, modify, or delete the document 20. The transferee 12 can access and perform various operations (e.g., view, modify, delete) via the transferee client device 162. Custody transfer rules may specify custody chains or sequences of arbitrary length (e.g., more than the two parties shown in this example). For example, custody of a document may transfer from a sales representative to a sales manager and thence to an in-house attorney.

In some embodiments, the document 20 may be associated with an envelope or other data structure that functions as a container that includes the document 20 (or a reference thereto) along with meta-information, including signature information, sender information (e.g., names, addresses), recipient/signer information (e.g., email addresses, names), and the like. Custody rules may be configured to manage access to an envelope and its related information. For example, one custody rule may specify that once the sender 10 has transferred control to the transferee 12, the sender 10 may view but not modify envelope information including the document 20. The transferee 11, in turn, may receive additional rights, such as to delete the document 20, view information added to a form associated with the document 20, clone the document 20, or the like. In some embodiments, a user may upload a file that contains information about multiple documents for which custody is to be transferred, so as to effect a bulk transfer from one party to another.

Figure 2:
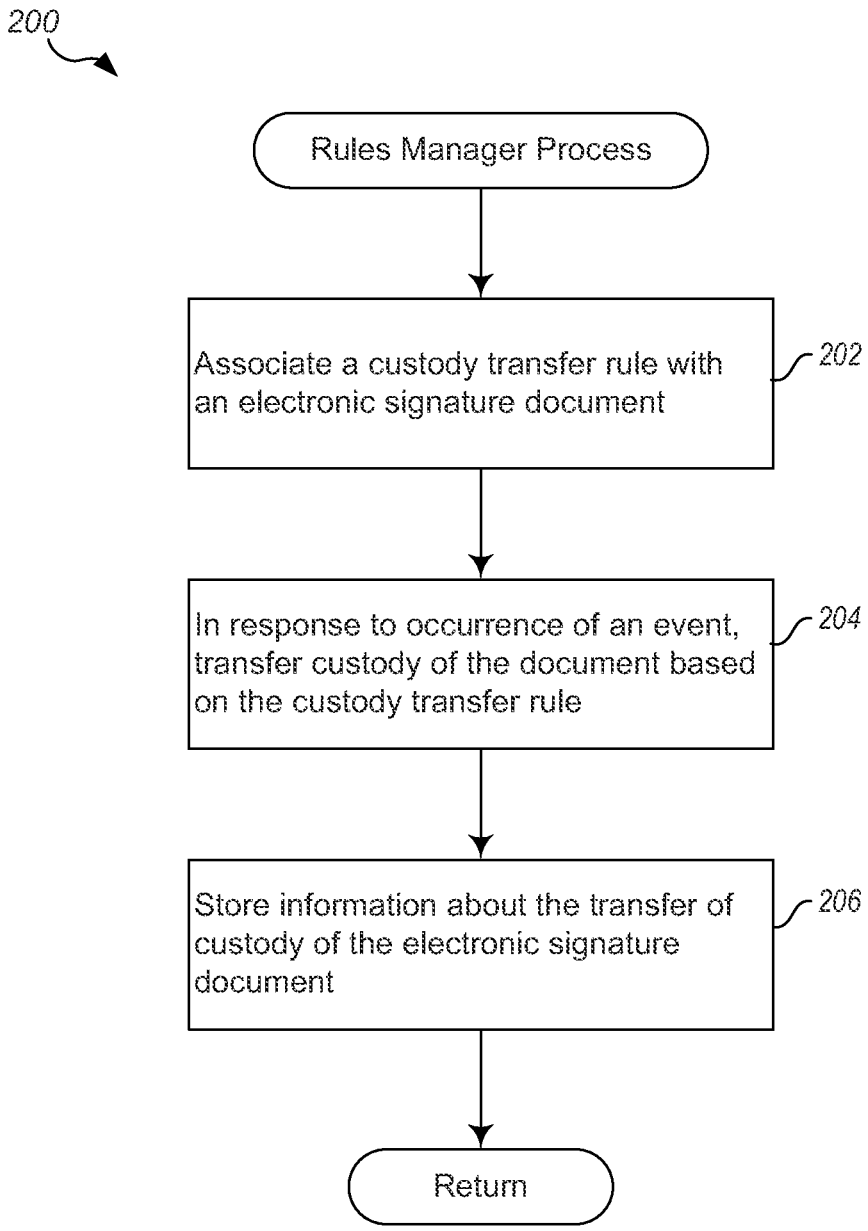
FIG. 2 is a flow diagram of an example rules manager process according to an example embodiment.

FIG. 2 is a flow diagram of an example rules manager process 200 according to an example embodiment. The process of FIG. 2 may be performed by the ESS 110.

The illustrated process begins at block 202, where it associates a custody transfer rule with an electronic signature document. Associating a custody rule may include storing data structure or record that relates the custody rule with the document. The custody rule itself may be a data structure or record that includes indications of the document, users impacted by the custody rule, conditions or events that trigger custody transfers, access rights impacted by the rule, or the like.

At block 204, the process, in response to occurrence of an event, transfers custody of the document based on the custody transfer rule. Transferring custody may include removing one or more access rights from the first user, and in turn, granting those access rights to a second user. Different kinds of events may trigger the transfer operation, including the presentation (e.g., viewing), receipt, signature, or other operation upon or with respect to a signature document. Some events may be time based, so that custody transfers are triggered upon a passage of time or on a specified calendar day.

At block 206, the process stores information about the transfer of custody of the electronic signature document. Storing information about custody transfer may include updating a data structure or record to reflect a new document owner, to remove rights from one user, to grant rights to another user, or the like. After block 206, the process ends.

The process may perform additional or different operations. In some embodiments, the process may also enforce access rules governed by the custody rule. For example, when the process receives an indication that a user is attempting to perform some operation (e.g., view, edit, delete) with respect to the signature document or its metadata, the process may allow or disallow the operation based on a determination whether the user has the appropriate access rights to perform the indicated operation.

Figure 3:
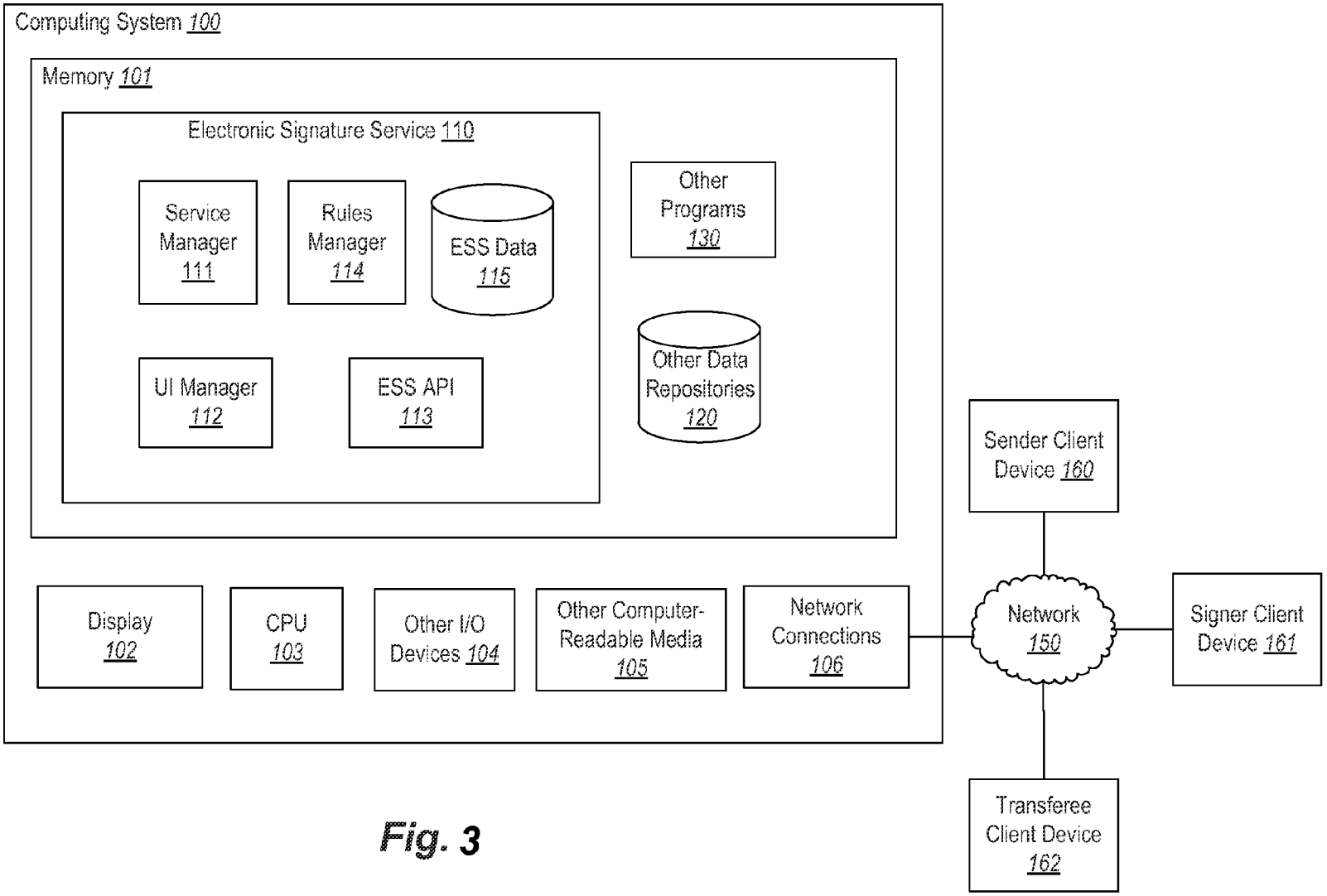
FIG. 3 is a block diagram of an example computing system for implementing an electronic signature service according to an example embodiment.

FIG. 3 is a block diagram of an example computing system for implementing an electronic signature service according to an example embodiment. In particular, FIG. 3 shows a computing system 100 that may be utilized to implement an ESS 110.

Note that one or more general purpose or special purpose computing systems/devices may be used to implement the ESS 110. In addition, the computing system 100 may comprise one or more distinct computing systems/devices and may span distributed locations. Furthermore, each block shown may represent one or more such blocks as appropriate to a specific embodiment or may be combined with other blocks. Also, the ESS 110 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The ESS 110 is shown residing in memory 101. In other embodiments, some portion of the contents, some or all of the components of the ESS 110 may be stored on and/or transmitted over the other computer-readable media 105. The components of the ESS 110 preferably execute on one or more CPUs 103 and manage electronic signature processes including custody transfers as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 3 may not be present in any specific implementation. For example, some embodiments may not provide other computer readable media 105 or a display 102.

The ESS 110 includes a service manager 111, a user interface ("UI") manager 112, an electronic signature service application program interface ("API") 113, a rules manager 114, and an electronic signature service data store 115.

The ESS 110, via the service manager 111 and related logic, generally performs electronic signature-related functions for or on behalf of users operating a sender client device 160, a signer client device 161, and a transferee client device 162. In one embodiment, a sender operating the sender client device 160 provides (e.g., transmits, uploads, sends) a document to be electronically signed to the ESS 110. The ESS 110 stores the document securely in data store 115. Secure document storage may include using cryptographic techniques to detect document tampering, such as generating hashes, message digests, or the like. In some embodiments, the document is stored as part of (or in association with) an "envelope" that is used to track and record information about the document as it progresses through its lifecycle of creation, transfer, signature, completion, and the like.

A signer operating the signer client device 161 then accesses, reviews, and signs the document stored by the ESS 110. In some embodiments, the ESS 110 transmits images or some other representation of the document to the signer client device 161, which in turn transmits signature data including an indication of the signer's signature (or intent to sign) to the ESS 110. The ESS 110 then securely stores the provided signature data in association with the document in the data store 115.

The rules manager 114 facilitates custody transfers of electronic signature documents as discussed herein. Initially, a sender or other user operating the sender client device 160 may associate custody transfer rules with an electronic signature document stored in the data store 115. The rules manager 114 tracks and executes the specified rules as appropriate. For example, if a rule indicates custody transfer upon document signature, the rules manager 114 monitors the document and, in response to a received signature, modifies (or causes to be modified) data structures or other records that specify or control access rights or operations associated with the document. In particular, access rights may be removed or disassociated from a first user. In addition or instead, the same or different access rights may be granted or otherwise associated with a second user. In some embodiments, custody transfers may occur between groups of users.

A custody transfer rule may be represented as a data structure, record in a database, or similar. The custody transfer rule may include indications of users that are impacted by the rule, events that trigger the rule, and access rights (e.g., view, modify, delete) that are shifted based on the rule and one or more events.

The UI manager 112 provides a view and a controller that facilitate user interaction with the ESS 110 and its various components. For example, the UI manager 112 may provide interactive access to the ESS 110, such that users can upload or download documents for signature, create and/or configure custody rules associated with or incorporated into signature documents, and the like. In some embodiments, access to the functionality of the UI manager 112 may be provided via a Web server, possibly executing as one of the other programs 130. In such embodiments, a user operating a Web browser (or other client) executing on one of the client devices 160-162 can interact with the ESS 110 via the UI manager 112.

The API 113 provides programmatic access to one or more functions of the ESS 110. For example, the API 113 may provide a programmatic interface to one or more functions of the ESS 110 that may be invoked by one of the other programs 130 or some other module. In this manner, the API 113 facilitates the development of third-party software, such as user interfaces, plug-ins, news feeds, adapters (e.g., for integrating functions of the ESS 110 into Web applications), and the like. In addition, the API 113 may be in at least some embodiments invoked or otherwise accessed via remote entities, such as a third-party system (not shown), to access various functions of the ESS 110. For example, a customer relationship management system may push or otherwise import customer data and/or agreements into the ESS via the API 113.

The data store 115 is used by the other modules of the ESS 110 to store and/or communicate information. The components of the ESS 110 use the data store 115 to record various types of information, including documents, signatures, custody rules, and the like. Although the components of the ESS 110 are described as communicating primarily through the data store 115, other communication mechanisms are contemplated, including message passing, function calls, pipes, sockets, shared memory, and the like.

The ESS 110 interacts via the network 150 with client devices 160-162. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160-162 include personal computers, laptop computers, smart phones, personal digital assistants, tablet computers, and the like.

In an example embodiment, components/modules of the ESS 110 are implemented using standard programming techniques. For example, the ESS 110 may be implemented as a "native" executable running on the CPU 103, along with one or more static or dynamic libraries. In other embodiments, the ESS 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the ESS 110, such as in the data store 118, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 118 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the ESS 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring one or more elements from the set {A, B, C, . . . N}, and not N in addition to one or more elements from the set {A, B, C}.

All of the above-cited references, including U.S. Provisional Application No. 61/614,371, filed Mar. 22, 2012, entitled "SYSTEM AND METHOD FOR RULES-BASED CONTROL OF CUSTODY OF ELECTRONIC SIGNATURE TRANSACTIONS" are incorporated herein by reference in their entireties. Where a definition or use of a term in an incorporated reference is inconsistent with or contrary to the definition or use of that term provided herein, the definition or use of that term provided herein governs.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A computer-implemented method comprising:

accessing, by an Electronic *Signature* Service [System] (ESS) computing device, an electronic document uploaded to the ESS computing device by a first client computing device of a first user;

accessing, by the ESS computing device, a set of custody rules associated with the electronic document, the set of custody rules controlling access to the document by a plurality of users including the first user and a second user of a second client computing device, the set of custody rules including a custody rule transferring an access right from the first user to the second user based on occurrence of at least one event, *the first user and the second user belonging to a same organization*;

processing, by the ESS computing device, a transaction associated with the electronic document and involving a third client computing device of a third user of the plurality of users;

detecting, *by the ESS computing device,* based at least in part on evaluation of operations performed by the third client computing device in reference to the transaction, an occurrence of the at least one event; and in response to the occurrence of the at least one event, transferring, *by the ESS computing device,* custody of the electronic document from the first user to the second user in accordance with the access right, and denying the first user access, via the first client computing device, to the electronic document governed by the access right while granting the second user access, via the second client computing device, to the electronic document governed by the access right.

[2. The method of claim 1, wherein the event includes a response to an electronic signature request by the third user.]

[3. The method of claim 2, wherein the response includes one of:

a receipt of signature of the electronic document by the third user; or a refusal of signature of the electronic document by the third user.]

[4. The method of claim 1, wherein the access right comprises at least one of:

a right to modify the contents of the electronic document; and a right to delete the electronic document from the computing device.]

[5. The method of claim 1, wherein after the transferring custody of the electronic document from the first user to the second user, the first user is to retain a second access right to view the electronic document and to view a data structure comprising information corresponding to the signature of the electronic document.]

[6. The method of claim 1, further comprising storing data indicating the transfer of custody of the electronic document to prevent a client device associated with the first user from accessing the electronic document according to the access right with respect to the electronic document, and to allow access to the electronic document according to the access right with respect to the electronic document to a client device associated with the second user.]

[7. The method of claim 1, wherein the method further comprises:

transmitting an email to the third user, the email including a link operable to access the electronic document on the computing device, wherein the event comprises receiving an indication that the third user has activated the link to access the electronic document.]

[8. An Electronic Service System (ESS) computing device comprising:

a processor; and memory coupled to the processor and storing instructions that, when executed by the processor, cause the ESS computing device to perform operations comprising:

accessing an electronic document uploaded to the ESS computing device by a first client computing device of a first user;

accessing a set of custody rules associated with the electronic document, the set of custody rules controlling access to the document by a plurality of users including the first user and a second user of a second client computing device, the set of custody rules including a custody rule transferring an access right from the first user to a second user of the plurality of users based on occurrence of at least one event;

processing a transaction associated with the electronic document and involving a third client computing device of a third user of the plurality of users;

detecting, based at least in part on evaluation of operations performed by the third client computing device in reference to the transaction, an occurrence of the at least one event; and in response to the occurrence of the at least one event, transferring custody of the electronic document from the first user to the second user in accordance with the access right, and denying the first user access, via the first client computing device, to the electronic document governed by the access right while granting the second user access, via the second client computing device, to the electronic document governed by the access right.]

[9. The computing system of claim 8, wherein the event includes a response to an electronic signature request by the third user.]

[10. The computing system of claim 9, wherein the response includes one of:

a receipt of signature of the electronic document by the third user; or a refusal of signature of the electronic document by the third user.]

[11. The computing system of claim 8, wherein the access right comprises at least one of:

a right to modify the contents of the electronic document; and a right to delete the electronic document from the computing device.]

[12. The computing system of claim 8, wherein after the transferring custody of the electronic document from the first user to the second user, the first user is to retain a second access right to view the electronic document and to view a data structure comprising information corresponding to the signature of the electronic document.]

[13. The computing system of claim 8, wherein the instructions further include instructions that cause the computing system to perform an operation including storing data indicating the transfer of custody of the electronic document to prevent a client device associated with the first user from accessing the electronic document according to the access right with respect to the electronic document, and to allow access to the electronic document according to the access right with respect to the electronic document to a client device associated with the second user.]

[14. The computing system of claim 8, wherein the instructions further include instructions that cause the computing system to perform an operation including:

transmitting an email to the third user, the email including a link operable to access the electronic document on the computing device, wherein the event comprises receiving an indication that the third user has activated the link to access the electronic document.]

[15. A non-transitory computer-readable storage medium including instructions that, when executed on an Electronic Service System (ESS) computing device, cause the ESS computing device to perform operations including:

accessing an electronic document uploaded to the ESS computing device by a first client computing device of a first user;

accessing a set of custody rules associated with the electronic document, the set of custody rules controlling access to the document by a plurality of users including the first user, the set of custody rules including a first custody rule transferring an access right from the first user to a second user of the plurality of users based on occurrence of at least one event;

processing a transaction associated with the electronic document and involving a third client computing device of a third user of the plurality of users;

detecting, based at least in part on evaluation of operations performed by the third client computing device in reference to the transaction, an occurrence of the at least one event; and in response to the occurrence of the at least one event, transferring custody of the electronic document from the first user to the second user in accordance with the access right, and denying the first user access, via the first client computing device, to the electronic document governed by the access right while granting the second user access, via the second client computing device, to the electronic document governed by the access right.]

[16. The non-transitory computer-readable storage medium of claim 15, wherein the event includes a response to an electronic signature request by the third user.]

[17. The non-transitory computer-readable storage medium of claim 16, wherein the response includes one of:

a receipt of signature of the electronic document by the third user; or a refusal of signature of the electronic document by the third user.]

[18. The non-transitory computer-readable storage medium of claim 15, wherein the access right comprises at least one of:

a right to modify the contents of the electronic document; and a right to delete the electronic document from the computing device.]

[19. The non-transitory computer-readable storage medium of claim 15, wherein after the transferring custody of the electronic document from the first user to the second user, the first user is to retain a second access right to view the electronic document and to view a data structure comprising information corresponding to the signature of the electronic document.]

[20. The non-transitory computer-readable storage medium of claim 15, wherein the instructions further include instructions that cause the computing device to perform an operation including storing data indicating the transfer of custody of the electronic document to prevent a client device associated with the first user from accessing the electronic document according to the access right with respect to the electronic document, and to allow access to the electronic document according to the access right with respect to the electronic document to a client device associated with the second user.]

[21. The non-transitory computer-readable storage medium of claim 15, wherein the instructions further include instructions that cause the computing device to perform an operation including:

transmitting an email to the third user, the email including a link operable to access the electronic document on the computing device, wherein the event comprises receiving an indication that the third user has activated the link to access the electronic document.]

*22. A computer-implemented method comprising:*

*processing, by a server, a transaction associated with an electronic document and involving a third client computing device of a third user of a plurality of users, a first user and a second user of the plurality of users having respective access rights via first and second client computing devices to the electronic document, the first user and the second user belonging to a same organization, wherein client computing devices of the plurality of users operate independently of the server;*

*detecting, by the server, an occurrence of at least one event based at least in part on an operation performed by the third client computing device; and*

*in response to detecting the occurrence of the at least one event, transferring, by the server, custody of the electronic document from the first user to the second user, wherein transferring custody comprises modifying the respective access rights of the first user and second user.*

*23. The method of claim 22, wherein the at least one event includes a response to an electronic signature request by the third user.*

*24. The method of claim 23, wherein the response includes a signing of the electronic document by the third user or a refusal by the third user to sign the electronic document.*

*25. The method of claim 22, wherein the respective access rights comprises at least one of:*

*a right to modify contents of the electronic document and*

*a right to delete the electronic document from the server.*

*26. The method of claim 22, wherein after transferring custody of the electronic document from the first user to the second user, the first user retains a second access right to view the electronic document and to view a data structure comprising information corresponding to a signature of the electronic document.*

*27. The method of claim 22, further comprising storing data indicating a transfer of custody of the electronic document to prevent the first user from accessing the electronic document and to allow access to the electronic document by the second user.*

*28. The method of claim 22, further comprising:*

*transmitting an email to the third user, the email including a link to access the electronic document, wherein the event comprises receiving an indication that the third user has selected the link to access the electronic document.*

*29. A server comprising:*

*a processor; and*

*a non-transitory computer-readable storage medium storing instructions that, when executed by the processor, cause the server to perform operations comprising:*

*processing a transaction associated with an electronic document and involving a third client computing device of a third user of a plurality of users, a first user and a second user of the plurality of users having respective access rights via first and second client computing devices to the electronic document, the first user and the second user belonging to a same organization, wherein client computing devices of the plurality of users operate independently of the server;*

*detecting an occurrence of at least one event based at least in part on an operation performed by the third client computing device; and*

*in response to detecting the occurrence of the at least one event, transferring custody of the electronic document from the first user to the second user, wherein transferring custody comprises modifying the respective access rights of the first user and second user.*

*30. The server of claim 29, wherein the at least one event includes a response to an electronic signature request by the third user.*

*31. The server of claim 30, wherein the response includes a signing of the electronic document by the third user or a refusal by the third user to sign the electronic document.*

*32. The server of claim 29, wherein the respective access rights comprises at least one of:*

*a right to modify contents of the electronic document and*

*a right to delete the electronic document from the server.*

*33. The server of claim 29, wherein after transferring custody of the electronic document from the first user to the second user, the first user retains a second access right to view the electronic document and to view a data structure comprising information corresponding to a signature of the electronic document.*

*34. The server of claim 29, the instructions, when executed by the processor, cause the server to perform further operations comprising: storing data indicating a transfer of custody of the electronic document to prevent the first user from accessing the electronic document and to allow access to the electronic document by the second user.*

*35. The server of claim 29, the instructions, when executed by the processor, cause the server to perform further operations comprising:*

*transmitting an email to the third user, the email including a link to access the electronic document, wherein the event comprises receiving an indication that the third user has selected the link to access the electronic document.*

* * * * *